United States Patent [19]

Aitken

[11] Patent Number: 5,286,683
[45] Date of Patent: Feb. 15, 1994

[54] ALKALI METAL, COPPER PHOSPHATE GLASSES

[75] Inventor: Bruce G. Aitken, Corning, N.Y.

[73] Assignee: Corning Incorporated, Corning, N.Y.

[21] Appl. No.: 972,416

[22] Filed: Nov. 5, 1992

[51] Int. Cl.$^5$ .............................. C03C 3/16
[52] U.S. Cl. ...................... 501/45; 501/44; 501/46; 501/47; 501/48
[58] Field of Search ............... 501/44, 45, 46, 47, 501/48

[56] References Cited

U.S. PATENT DOCUMENTS

| | | | |
|---|---|---|---|
| 4,482,541 | 11/1984 | Telfer et al. | 501/45 X |
| 4,940,677 | 7/1990 | Beall et al. | |
| 4,996,172 | 2/1991 | Beall et al. | |
| 5,021,366 | 6/1991 | Aitken | |
| 5,043,369 | 8/1991 | Bahn et al. | |
| 5,071,795 | 10/1991 | Beall et al. | |
| 5,122,484 | 6/1992 | Beall et al. | |

*Primary Examiner*—Karl Group
*Attorney, Agent, or Firm*—Clinton S. Janes, Jr.

[57] ABSTRACT

This invention is directed to the production of glasses exhibiting transition temperatures below 375° C., preferably below 350° C., and superior resistance to attack by boiling water. The glasses contain at least 10% copper, as expressed in terms of CuO, the predominant proportion of the copper being present in the $Cu^{+2}$ oxidation state. The glasses consist essentially, in mole percent, of

| | | | | | |
|---|---|---|---|---|---|
| $Li_2O$ | 0-15 | MgO | 0-15 | $B_2O_3$ | 0-5 |
| $Na_2O$ | 0-20 | CaO | 0-20 | ZnO | 0-37 |
| $K_2O$ | 0-10 | SrO | 0-20 | $Sb_2O_3$ | 0-36 |
| $Tl_2O$ | 0-15 | BaO | 0-20 | $CeO_2$ | 0-3 |
| $Li_2O + Na_2O +$ $K_2O + Tl_2O$ | 12-30 | MgO + CaO + SrO + BaO | 0-25 | $MoO_3$ | 0-7 |
| CuO | 10-50 | $Al_2O_3 + B_2O_3$ | 0-5 | $RE_2O_3$ | 0-2 |
| $P_2O_5$ | 28-36 | $Al_2O_3$ | 0-5 | $WO_3$ | 0-7 |
| MnO | 0-20 | | | | | wherein at least two alkali metal oxides are present and up to 12% by weight fluoride may optionally be present.

2 Claims, No Drawings

ALKALI METAL, COPPER PHOSPHATE GLASSES

BACKGROUND OF THE INVENTION

Considerable research has been conducted in the past to devise inorganic glasses exhibiting low transition temperatures (Tg), thereby enabling melting and forming operations to be carried out at low temperatures with consequent savings in energy costs. More recently, it has been recognized that glasses demonstrating low transition temperatures are potentially useful materials for a host of applications including low temperature sealing glasses and glass-organic polymer composites. A very recent development disclosed in U.S. Pat. No. 5,043,369 (Bahn et al.) involves the production of glass-organic polymer alloys. Those alloys are prepared from a glass and a thermoplastic or thermosetting polymer having compatible working temperatures. Thus, the glass and the polymer are combined at the working temperature to form an intimate mixture; that is, the glass and polymer are in a sufficiently fluid state to be blended together to form a body displaying an essentially uniform, fine-grained microstructure in which, desirably, there is at least partial miscibility and/or a reaction between the glass and the polymer to promote adhesion and bonding therebetween. An article is shaped from the blend and then cooled to room temperature. Such articles exhibit chemical and physical properties comprising a composite of those demonstrated by the particular glass and polymer. For example, the alloys frequently display a combination of high surface hardness, high stiffness, and high toughness.

Glasses having base compositions within the general zinc phosphate system have been found to be especially suitable for the glass component of glass-polymer alloys. Several illustrations of recent research in that composition system are reported below.

U.S. Pat. No. 4,940,677 (Beall et al.) discloses glasses exhibiting transition temperatures below 450° C., preferably below 350° C., consisting essentially, in mole percent, of at least 65% total of 23–55% ZnO, 28–40% $P_2O_5$, and 10–35% $R_2O$, wherein $R_2O$ consists of at least two alkali metal oxides in the indicated proportions selected from the group of 0–25% $Li_2O$, 0–25% $Na_2O$, and 0–25% $K_2O$, and up to 35% total of optional constituents in the indicated proportions selected from the group of 0–6% $Al_2O_3$, 0–8% $B_2O_3$, 0–8% $Al_2O_3+B_2O_3$, 0–15% $Cu_2O$, 0–5% F, 0–35% PbO, 0–35% SnO, 0–35% PbO+SnO, 0–5% $ZrO_2$, 0–4% $SiO_2$, and 0–15% MgO+CaO+SrO+BaO+MnO, consisting of 0–10% MgO, 0–10% CaO, 0–10% SrO, 0–12% BaO, and 0–10% MnO.

U.S. Pat. No. 4,996,172 (Beall et al.) describes glasses demonstrating transition temperatures below 350° C. consisting essentially, in mole percent, of 30–55% ZnO, 28–45% $P_2O_5$, 10–35% $R_2O$, wherein $R_2O$ consists of at least two alkali metal oxides in the indicated proportions of 0–25% $Li_2O$, 0–25% $Na_2O$, and 0–25% $K_2O$, 0–4% $Al_2O_3$, 0–10% total of at least one divalent metal oxide selected from the group of CaO, MgO, and MnO, 0–15% CuO, 0–35% PbO, 0–35% SnO, 0–35% SnO+PbO, and 0.5–5% total of $Y_2O_3$ and/or at least one rare earth metal oxide of the lanthanide series.

U.S. Pat. No. 5,021,366 (Aitken) is directed to glasses having annealing points between 300°–340° C. which are fluorine-free and consist essentially, in mole percent, of

| | | | |
|---|---|---|---|
| $Li_2O$ | – 5–10 | $P_2O_5$ | 30–36 |
| $Na_2O$ | 5–15 | $Al_2O_3$ | 0–5 |
| $K_2O$ | 0–6 | $CeO_2$ | 0–2 |
| $Li_2O + Na_2O + K_2O$ | 15–25 | SnO | 0–20 |
| ZnO | 10–33 | PbO | 0–20 |
| CaO | 0–20 | $Sb_2O_3$ | 0–12 |
| SrO | 0–20 | $Bi_2O_3$ | 0–6 |
| BaO | 0–20 | $SnO + PbO + Sb_2O_3 + Bi_2O_3$ | 0–20. |
| $CaO + SrO + BaO$ | 12–25 | | |

U.S. Pat. No. 5,071,795 (Beall et al.) illustrates glasses exhibiting transition temperatures no higher than 350° C. consisting essentially, in mole percent, of

| | | | |
|---|---|---|---|
| $Li_2O$ | 0–25 | ZnO | 25–50 |
| $Na_2O$ | 5–20 | $Al_2O_3$ | 0–3 |
| $K_2O$ | 0–12 | $P_2O_5$ | 25–37 |
| $Li_2O + Na_2O + K_2O$ | 15–35 | SrO | 0–10 | to which are included 0.5–8% Cl and 0–5% F as analyzed in weight percent. Up to 10% $Cu_2O$, up to 3% $SiO_2$, and up to 8% total of at least one alkaline earth metal oxide may be included.

U.S. Pat. No. 5,122,484 (Beall et al.) is drawn to glasses having transition temperatures no higher than about 425° C. which were specifically designed for use as sealing frits in television picture tube applications. The glass compositions were PbO-free and consisted essentially, in weight percent, of:

| | | | |
|---|---|---|---|
| $Li_2O$ | 0.75–5 | $SnO_2$ | 0–10 |
| $Na_2O$ | 2–10 | $MoO_3$ | 0–10 |
| $K_2O$ | 2–10 | $WO_3$ | 0–10 |
| $Li_2O + Na_2O + K_2O$ | 5–25 | $MoO_3 + WO_3$ | 2–25 |
| ZnO | 29–42 | Cl | 0–8 (analyzed) |
| $P_2O_5$ | 38–50 | $SnO_2 + MoO_3 + WO_3 + Cl$ | 2–25. |
| $Al_2O_3$ | 0–5 | | |

One inherent drawback of phosphate-based glass compositions having low transition temperatures is their reduced resistance to attack by water and mild solutions of acids and bases, when compared to silicate-based glasses. The above-described zinc phosphate glasses demonstrate relatively excellent resistance to chemical attack, when compared to other phosphate-based glasses. Nevertheless, the search has been continuous to discover new glass compositions manifesting low transition temperatures with even greater chemical durability.

Accordingly, the principal objective of the present invention was to devise glass compositions having transition temperatures below 375° C., preferably between about 300°-350° C., wherein the chemical durability is much improved over that of zinc phosphate-based glasses.

SUMMARY OF THE INVENTION

The subject invention is founded in the discovery of glasses which can be of essentially zinc-free phosphate compositions. More specifically, the inventive glasses have base compositions in the alkali metal phosphate system wherein copper in the $Cu^{+2}$ oxidation state is substituted for $Zn^{+2}$. The use of CuO instead of ZnO in the alkali metal phosphate glasses leads to the following several advantages:

(1) the glasses demonstrate such excellent stability that Zn-free glasses containing up to 45% CuO can be prepared without the occurrence of devitrification;

(2) the complete replacement of ZnO by CuO commonly results in only a 20°-25° C. increase in transition temperature, with some combinations of high CuO and low ZnO contents yielding glasses demonstrating lower transition temperatures than glasses containing either CuO or ZnO alone; and (3) the chemical durability of the glasses, as reckoned by measuring weight loss after an immersion for six hours in boiling water, is significantly improved.

In U.S. Pat. No. 4,940,677, supra, copper is recognized as a useful additive, the patent explicitly stating that "$Cu_2O$ may be included up to 15%", thereby indicating that the copper included therein is present in the monovalent, rather than the divalent, state. Expressed in another way, copper is present as $Cu^+$ ions, rather than $Cu^{+2}$ ions, or, as an oxide, $Cu_2O$, rather than CuO. Magnetic susceptibility measurements of the oxidation state of the copper in the subject inventive glasses have indicated that most of the copper is present in the $Cu^{+2}$ state. Accordingly, instead of functioning in like manner to an alkali metal, copper performs a role similar to that of Zn and the alkaline earth metals in the instant inventive glasses. That phenomenon has been conjectured as explaining the capability of copper to maintain the Tg of the glasses at low values (Zn-like behavior), coupled with its capability to enhance the chemical durability of the glasses (alkaline earth metal-like behavior). Whereas those inventive glasses containing the greatest concentrations of copper exhibit transition temperatures somewhat higher than their Zn-containing analogues, if desired the Tg can be lowered substantially with little adverse affect upon chemical durability, and without reducing the level of CuO, by adding fluoride to the glass composition.

The present invention is based upon the discovery that alkali metal, copper phosphate glasses containing CuO in concentrations of at least 10 mole percent can be prepared which demonstrate a combination of low Tg (below 375° C. and preferably below 350° C.) and excellent resistance to attack by boiling water, thereby rendering them eminently suitable for the manufacture of glass-polymer composites and low temperature sealing glasses. Accordingly, the inventive glasses consist essentially, expressed in terms of mole percent on the oxide basis, of

| | | | |
|---|---|---|---|
| $Li_2O$ | 0–15 | BaO | 0–20 |
| $Na_2O$ | 0–20 | MgO + CaO + SrO + BaO | 0–25 |
| $K_2O$ | 0–10 | $Al_2O_3$ | 0–5 |
| $Tl_2O$ | 0–15 | $B_2O_3$ | 0–5 |
| $Li_2O + Na_2O + K_2O + Tl_2O$ | 12–30 | $Al_2O_3 + B_2O_3$ | 0–5 |
| CuO | 10–50 | ZnO | 0–37 |
| $P_2O_5$ | 28–36 | $Sb_2O_3$ | 0–36 |
| MgO | 0–15 | $CeO_2$ | 0–3 |
| CaO | 0–20 | $MoO_3$ | 0–7 |
| SrO | 0–20 | MnO | 0–20 |
| $WO_3$ | 0–7 | *$RE_2O_3$ | 0–2 | wherein at least two alkali metal oxides will be present and fluoride may optionally be present in an amount up to 12% by weight.

The preferred glasses contain at least two alkali metal oxides and consist essentially, in mole percent, of:

| | | | | | |
|---|---|---|---|---|---|
| $Li_2O$ | 5–10 | $P_2O_5$ | 30–35 | $Al_2O_3$ | 0–3 |
| $Na_2O$ | 5–15 | CaO | 0–15 | $B_2O_3$ | 0–3 |
| $K_2O$ | 0–7 | SrO | 0–15 | $Al_2O_3 + B_2O_3$ | 0–3 |
| $Li_2O + Na_2O + K_2O$ | 13–25 | BaO | 0–15 | ZnO | 0–30 |
| CuO | 15–45 | CaO + SrO + BaO | 0–15 | F | 0–8 |
| $Sb_2O_3$ | 0–27 | | | | (wt. %). |

Whereas it is not mathematically possible to convert composition ranges expressed in terms of mole percent to exact composition ranges expressed in terms of weight percent, the following values represent approximations of the base compositions of the inventive glasses in terms of weight percent:

| | | | |
|---|---|---|---|
| $Li_2O$ | 0–5.7 | BaO | 0–30.8 |
| $Na_2O$ | 0–15.5 | MgO + CaO + SrO + BaO | 0–35.0 |
| $K_2O$ | 0–11.5 | $Al_2O_3$ | 0–6.4 |
| $Tl_2O$ | 0–48.0 | $B_2O_3$ | 0–4.4 |
| $Li_2O + Na_2O + K_2O + Tl_2O$ | 1.9–54.1 | $Al_2O_3 + B_2O_3$ | 0–6.4 |
| CuO | 3.3–45.7 | ZnO | 0–34.9 |
| $P_2O_5$ | 16.3–60.9 | $Sb_2O_3$ | 0–64.8 |
| MgO | 0–7.7 | $CeO_2$ | 0–6.4 |
| CaO | 0–14.0 | $MoO_3$ | 0–12.1 |

| | | | | |
|---|---|---|---|---|
| SrO | 0–23.4 | MnO | | 0–21.1 |
| WO₃ | 0–18.1 | RE₂O₃ | | 0–9.3 |

DESCRIPTION OF PREFERRED EMBODIMENTS

Table I records a group of glass compositions melted on a laboratory scale and reported in terms of mole percent on the oxide basis illustrating the parameters of the subject invention. Because it is not known with which cation(s) the fluoride is combined, it is simply tabulated in terms of the metal fluoride by which is was included in the glass batch. Table IA recites the same group of glass compositions expressed in terms of parts by weight on the oxide basis. Because the sum of the individual components closely approximates 100, for all practical purposes the values listed can be deemed to represent weight percent. The actual batch ingredients may comprise any materials, either oxides or other compounds, which, when melted together, will be converted into the desired oxide in the proper proportions. For example, $Li_2CO_3$ may constitute the source of $Li_2O$ and $ZnF_2$ may provide the source of ZnO and F.

The batch ingredients were compounded, tumble mixed together to aid in achieving a homogeneous melt, and then charged into platinum crucibles. After placing lids thereon, the crucibles were moved into a furnace operating at about 1000° C. and the batches melted for about 3 hours. Thereafter, the melts were poured into steel molds to form glass slabs having dimensions of about 6″×4″×0.5″ (~15.2×10.2×1.3 cm) which were transferred immediately to an annealer operating at about 300° C.

It will be appreciated that the above description reflects laboratory scale melting and forming only, and that large scale melts thereof can be carried out in commercial melting units with the resultant molten glass being shaped utilizing conventional glass forming techniques and equipment. It is only necessary that the batch ingredients be melted at a temperature and for a time sufficient to yield a homogeneous melt.

TABLE I

| | 1 | 2 | 3 | 4 | 5 | 6 | 7 | 8 |
|---|---|---|---|---|---|---|---|---|
| Li₂O | 7.0 | 7.0 | 7.0 | 7.0 | 7.0 | 7.0 | 7.0 | 7.0 |
| Na₂O | 8.0 | 8.0 | 8.0 | 8.0 | 8.0 | 8.0 | 8.0 | 8.0 |
| K₂O | 5.0 | 5.0 | 5.0 | 5.0 | 5.0 | 5.0 | 5.0 | 5.0 |
| CuO | 15.0 | 15.0 | 15.8 | 30.0 | 30.0 | 30.0 | 45.0 | 15.0 |
| ZnO | 30.0 | 15.0 | — | 15.0 | 7.5 | — | — | 15.0 |
| Sb₂O₃ | — | 15.0 | 29.2 | — | 7.5 | 15.0 | — | — |
| CaO | — | — | — | — | — | — | — | 11.3 |
| BaO | — | — | — | — | — | — | — | 7.7 |
| Al₂O₃ | 2.0 | 2.0 | 2.0 | 2.0 | 2.0 | 2.0 | 2.0 | 2.0 |
| P₂O₅ | 33.0 | 33.0 | 33.0 | 33.0 | 33.0 | 33.0 | 33.0 | 33.0 |

| | 9 | 10 | 11 | 12 | 13 | 14 | 15 | 16 |
|---|---|---|---|---|---|---|---|---|
| Li₂O | 7.0 | 7.0 | 7.0 | 7.0 | 7.0 | 7.0 | 7.0 | 7.0 |
| Na₂O | 8.0 | 8.0 | 8.0 | 8.0 | 8.0 | 8.0 | 8.0 | 8.0 |
| K₂O | 5.0 | 5.0 | 5.0 | 5.0 | 5.0 | 5.0 | 5.0 | 5.0 |
| CuO | 30.0 | 45.0 | 15.0 | 15.0 | 15.0 | 30.0 | 30.0 | 30.0 |
| ZnO | — | — | 20.0 | 10.0 | 0.9 | 7.5 | — | 7.5 |
| CaO | 11.2 | — | — | — | — | — | — | — |
| BaO | 3.8 | — | — | — | — | — | — | — |
| ZnF₂ | — | — | 10.0 | 20.0 | 29.1 | 7.5 | 15.0 | 7.5 |
| Al₂O₃ | 2.0 | — | 3.0 | 2.0 | 2.0 | 2.0 | 2.0 | 2.0 |
| P₂O₅ | 33.0 | 35.0 | 33.0 | 33.0 | 33.0 | 33.0 | 33.0 | 33.0 |

| | 17 | 18 | 19 | 20 | 21 | 22 | 23 |
|---|---|---|---|---|---|---|---|
| Li₂O | 7.0 | 7.0 | 7.0 | 7.0 | 7.0 | 7.0 | 7.0 |
| Na₂O | 8.0 | 8.0 | 8.0 | 8.0 | 8.0 | 8.0 | 12.0 |
| K₂O | 5.0 | 5.0 | 5.0 | 5.0 | 5.0 | 5.0 | — |

TABLE I-continued

| | | | | | | | |
|---|---|---|---|---|---|---|---|
| CuO | 15.0 | 15.0 | 15.0 | — | 15.0 | 25.0 | 15.0 |
| ZnO | 0.9 | 0.9 | 0.9 | 45.0 | 30.0 | 20.0 | 30.0 |
| CaO | 7.5 | — | — | — | — | — | — |
| BaO | 7.5 | 7.5 | — | — | — | — | — |
| ZnF₂ | 14.1 | 14.1 | 14.1 | — | — | — | — |
| CaF₂ | — | 7.5 | 7.5 | — | — | — | — |
| BaF₂ | — | — | 7.5 | — | — | — | — |
| Al₂O₃ | 2.0 | 2.0 | 2.0 | — | — | — | 2.0 |
| B₂O₃ | — | — | — | — | 2.0 | 2.0 | — |
| P₂O₅ | 33.0 | 33.0 | 33.0 | 35.0 | 33.0 | 33.0 | 33.0 |

| | 24 | 25 | 26 | 27 | 28 | 29 | 30 |
|---|---|---|---|---|---|---|---|
| Li₂O | 80 | 5.3 | 5.3 | 7.0 | 7.0 | 7.0 | 7.0 |
| Na₂O | 12.0 | 6.0 | 6.0 | 8.0 | 7.0 | 8.0 | 8.0 |
| K₂O | — | 3.7 | 3.7 | 5.0 | 6.0 | 5.0 | — |
| Tl₂O | — | — | — | — | — | — | 5.0 |
| CuO | 25.0 | 15.0 | 25.0 | 15.0 | 30.0 | 15.0 | 30.0 |
| ZnO | 20.0 | 35.0 | 25.0 | 15.0 | 13.0 | — | 15.0 |
| MgO | — | — | — | 5.0 | — | — | — |
| CaO | — | — | — | 5.0 | — | — | — |
| BaO | — | — | — | 5.0 | — | — | — |
| ZnF₂ | — | — | — | — | — | 15.0 | — |
| MgF₂ | — | — | — | — | — | 5.0 | — |
| CaF₂ | — | — | — | — | — | 5.0 | — |
| BaF₂ | — | — | — | — | — | 5.0 | — |
| Al₂O₃ | 2.0 | 2.0 | 2.0 | 2.0 | 2.0 | 2.0 | 2.0 |
| P₂O₅ | 33.0 | 33.0 | 33.0 | 33.0 | 33.0 | 33.0 | 33.0 |
| CeO₂ | — | — | — | — | 2.0 | — | — |

TABLE IA

| | 1 | 2 | 3 | 4 | 5 | 6 | 7 | 8 |
|---|---|---|---|---|---|---|---|---|
| Li₂O | 2.0 | 1.6 | 1.3 | 2.2 | 1.9 | 1.6 | 2.2 | 2.2 |
| Na₂O | 5.9 | 3.9 | 3.1 | 5.1 | 4.4 | 3.9 | 5.1 | 5.1 |
| K₂O | 4.9 | 3.7 | 3.0 | 4.9 | 4.2 | 3.7 | 4.9 | 4.9 |
| CuO | 12.3 | 9.3 | 7.9 | 24.7 | 21.2 | 18.6 | 37.1 | 12.3 |
| ZnO | 25.2 | 9.5 | — | 12.6 | 5.4 | — | — | 12.6 |
| Sb₂O₃ | — | 34.0 | 53.7 | — | 19.4 | 34.1 | — | — |
| CaO | — | — | — | — | — | — | — | 6.5 |
| BaO | — | — | — | — | — | — | — | 5.9 |
| Al₂O₃ | 2.1 | 1.6 | 1.3 | 2.1 | 1.8 | 1.6 | 2.1 | 2.1 |
| P₂O₅ | 48.3 | 36.4 | 29.5 | 48.4 | 41.6 | 36.5 | 48.6 | 48.4 |

| | 9 | 10 | 11 | 12 | 13 | 14 | 15 | 16 |
|---|---|---|---|---|---|---|---|---|
| Li₂O | 2.2 | 2.2 | 2.1 | 2.1 | 2.0 | 2.1 | 2.1 | 2.1 |
| Na₂O | 5.1 | 5.1 | 5.0 | 4.9 | 4.8 | 5.0 | 5.0 | 4.9 |
| K₂O | 4.9 | 4.8 | 4.8 | 4.7 | 4.6 | 4.8 | 4.7 | 4.6 |
| CuO | 24.7 | 36.8 | 12.0 | 11.8 | 11.5 | 24.3 | 23.9 | 11.7 |
| ZnO | — | — | 24.6 | 24.1 | 23.6 | 12.4 | 12.2 | 11.9 |
| CaO | 6.5 | — | — | — | — | — | — | 4.1 |
| BaO | 6.0 | — | — | — | — | — | — | 11.3 |
| Al₂O₃ | 2.1 | — | 2.1 | 2.0 | 2.0 | 2.1 | 2.0 | 2.0 |
| F | — | — | 3.8 | 7.5 | 11.5 | 2.9 | 5.7 | 2.8 |
| P₂O₅ | 48.5 | 51.1 | 47.2 | 46.2 | 45.3 | 47.6 | 46.8 | 45.8 |

| | 17 | 18 | 19 | 20 | 21 | 22 | 23 |
|---|---|---|---|---|---|---|---|
| Li₂O | 2.0 | 2.0 | 2.0 | 2.1 | 2.2 | 2.2 | 2.5 |
| Na₂O | 4.8 | 4.7 | 4.6 | 5.1 | 5.2 | 5.2 | 7.8 |
| K₂O | 4.5 | 4.5 | 4.4 | 4.8 | 4.9 | 4.9 | — |
| CuO | 11.5 | 11.3 | 11.2 | — | 12.4 | 20.7 | 12.6 |
| ZnO | 11.8 | 11.6 | 11.4 | 37.3 | 25.3 | 16.9 | 25.7 |
| CaO | 4.1 | 4.0 | 3.9 | — | — | — | — |
| BaO | 11.1 | 10.9 | 10.8 | — | — | — | — |
| Al₂O₃ | 2.0 | 1.9 | 1.9 | — | — | — | 2.2 |
| B₂O₃ | — | — | — | — | 1.5 | 1.5 | — |
| F | 5.2 | 7.8 | 10.3 | — | — | — | — |
| P₂O₅ | 45.2 | 44.5 | 43.8 | 50.7 | 48.6 | 48.7 | 49.3 |

| | 24 | 25 | 26 | 27 | 28 | 29 | 30 |
|---|---|---|---|---|---|---|---|
| Li₂O | 2.5 | 1.6 | 1.6 | 2.2 | 2.1 | 2.0 | 1.9 |
| Na₂O | 7.8 | 3.8 | 3.8 | 5.1 | 4.4 | 4.8 | 4.4 |
| K₂O | — | 3.6 | 3.6 | 4.8 | 5.7 | 4.5 | — |
| Tl₂O | — | — | — | — | — | — | 18.8 |
| CuO | 21.0 | 12.2 | 20.3 | 12.3 | 24.1 | 11.5 | 21.1 |
| ZnO | 17.2 | 29.0 | 20.8 | 12.5 | 10.7 | 11.8 | 10.8 |

TABLE IA-continued

| | | | | | | | |
|---|---|---|---|---|---|---|---|
| MgO | — | — | — | 2.1 | — | 1.9 | — |
| CaO | — | — | — | 2.9 | — | 2.7 | — |
| BaO | — | — | — | 7.9 | — | 7.4 | — |
| $Al_2O_3$ | 2.2 | 2.1 | 2.1 | 2.1 | 2.1 | 2.0 | 1.8 |
| F | — | — | — | — | — | 10.6 | — |
| $P_2O_5$ | 49.4 | 47.7 | 47.8 | 48.1 | 47.4 | 45.2 | 41.4 |
| $CeO_2$ | — | — | — | — | 3.5 | — | — |

Table II reports the transition temperature (Tg), the annealing point (Ta), and the softening point (Ts) in terms of °C. where measured, as determined in accordance with techniques conventional in the glass art. Table II also records the weight loss (W.L.) expressed in percent exhibited by the glasses after an immersion for six hours in boiling deionized water, and a qualitative analysis of the weatherability of the glasses (Weath) based upon the visual appearance of the glasses after an exposure in a humidity chamber for 500 hours at 60° C. and 98% relative humidity. A weight loss greater than 0.1% is considered to represent unsatisfactory chemical durability, with losses less than 0.01% being greatly preferred. Legends for the weatherability character exhibited by the glasses include: nc=no change in appearance; xl=extra light frosted or hazy appearance; vl=very light frosted or hazy appearance; lf=light frosted or hazy appearance; ca=caked. The most preferred glasses will exhibit no frosting or haze. Nonetheless, where frosting or haze can be observed only when the glass is viewed at a small angle (described as xl or vl), the glasses will be deemed satisfactory for use in most applications. (When subjected to the above-described weatherability test, the glasses encompassed within U.S. Pat. No. 4,940,677, supra, generally exhibited a marked hazy appearance.) Finally, Table II chronicles the percentage of the copper present in the glass in the form of $Cu^{+2}$, as determined via magnetic susceptibility measurements.

TABLE II

| | 1 | 2 | 3 | 4 | 5 | 6 | 7 | 8 |
|---|---|---|---|---|---|---|---|---|
| Tg | 322 | 324 | 333 | 339 | 367 | 340 | 360 | 347 |
| Ta | — | — | — | — | — | — | 367 | — |
| Ts | — | — | — | — | — | — | 419 | — |
| W.L. | 0.00 | 0.00 | 0.06 | <0.01 | 0.01 | 0.00 | 001 | <0.01 |
| Weath. | xl | xl | nc | vl | vl | xl | lf | nc |
| $Cu^{+2}$ | 69 | 74 | 74 | 74 | 76 | 77 | 76 | 75 |

| | 9 | 10 | 11 | 12 | 13 | 14 | 15 | 16 |
|---|---|---|---|---|---|---|---|---|
| Tg | 362 | — | 336 | — | 303 | 344 | 341 | — |
| W.L. | 0.00 | 0.00 | 0.00 | 0.01 | <0.01 | <0.01 | 0.01 | <0.01 |
| Weath | nc | — | vl | vl | vl | lf | vl | nc |
| $Cu^{+2}$ | 72 | 78 | 81 | 78 | 82 | — | — | — |

| | 17 | 18 | 19 | 20 | 21 | 22 | 23 |
|---|---|---|---|---|---|---|---|
| Tg | 334 | — | 311 | 310 | 323 | 333 | 340 |
| W.L. | <0.01 | 0.01 | 0.01 | 0.50 | 0.03 | 0.01 | 0.03 |
| Weath | nc | nc | nc | ca | — | — | — |
| $Cu^{+2}$ | — | — | — | 0 | — | — | — |

| | 24 | 25 | 26 | 27 | 28 | 29 | 30 |
|---|---|---|---|---|---|---|---|
| Tg | 345 | 346 | 354 | 356 | 350 | 322 | 335 |
| W.L. | 0.02 | <0.01 | <0.01 | 0.00 | <0.01 | <0.01 | 0.01 |
| Weath | — | — | — | — | — | — | — |
| $Cu^{+2}$ | — | — | — | — | — | — | — |

As can be observed from Table II, the copper contained in the inventive glasses is present predominantly in an oxidation state of $Cu^{+2}$. Furthermore, the glasses demonstrate weight losses of about 0.01% and less in the above-described boiling water test, whereas the glasses of U.S. Pat. No. 4,940,677, supra, exhibit weight losses in the same test of 0.1% and greater. A comparison of the properties of Examples 10 (Zn-free) and 20 ($Cu^{+2}$-free) is of special interest in that the latter glass suffered a weight loss of 0.5%, compared to essentially no loss on the part of the former, and frosted badly in the weathering test. Finally, a study of Table I and II fully supports the crux of the present inventive compositions; viz., that although the Tg of the inventive glasses is somewhat higher than that customarily exhibited by the prior art zinc-containing glasses, the presence of high levels of copper in the $Cu^{+2}$ oxidation state, provides glasses demonstrating much better chemical durability.

To specifically compare the differences in chemical and physical properties exhibited in a glass composition wherein the copper is present predominantly in the $Cu^{+2}$ state with a glass composition wherein the copper is present predominantly in the $Cu^{+1}$ state, the following laboratory investigation was undertaken utilizing Example 8 of U.S. Pat. No. 4,940,677 supra. As set forth in that patent, the glass consists, in mole percent, of 7% $Li_2O$, 7% $Na_2O$, 10% $Cu_2O$, 39% ZnO, 2% $Al_2O_3$, and 39% $P_2O_5$.(When formulated in terms of CuO, instead of $Cu_2O$, the glass consists, in mole percent, of 6.4% $Li_2O$, 6.4% $Na_2O$, 18.2% CuO, 35.5% ZnO, 1.8% $Al_2O_3$ and 31.8% $P_2O_5$)

The sets of two batches were compounded, tumble mixed together, charged into crucibles, and the batches melted, poured into slabs, and annealed in the manner described above. The first set of two batches was compounded using a cuprous ($Cu^+$) source of copper, viz., $Cu_2O$, and the second set of two batches was compounded using a cupric ($Cu^{+2}$) source of copper, viz., $Cu_2P_2O_7$, cupric pyrophosphate. One batch of each set was melted under reducing conditions, i.e., using ammonium dihydrogen phosphate ($NH_4H_2PO_4$) as a source of $P_2O_5$ with $SiO_2$ crucibles. The other batch of each set was melted under oxidizing conditions, using zinc pyrophosphate ($Zn_2P_2O_7$) as a source of ZnO and $P_2O_5$ with platinum crucibles. In Table III below, Example A utilized $Cu_2O$ as the source of copper and was melted under reducing conditions employing $NH_4H_2PO_4$ as a source of $P_2O_5$. Example B utilized $Cu_2O$ as the source of copper and was melted under oxidizing conditions employing $Zn_2P_2O_7$ as a source of ZnO and $P_2O_5$. Example C utilized $Cu_2P_2O_7$ as the source of copper and was melted under reducing conditions employing $NH_4H_2PO_4$ as a source of $P_2O_5$. Example D utilized $Cu_2P_2O_7$ as the source of copper and was melted under reducing conditions employing $Zn_2P_2O_7$ as a source of ZnO and $P_2O_5$.

Table III also records the transition temperature (Tg), the % weight loss (W.L.) and the percentage of the copper present in the glass in the form of $Cu^{+2}$), along with a visual description of the appearance (Appear) of the annealed glass slabs.

TABLE III

|  | A | B | C | D |
|---|---|---|---|---|
| Tg | 321 | 322 | 355 | 361 |
| W.L. | <0.01 | <0.01 | 0.00 | 0.00 |
| $Cu^{+2}$ | 39 | 41 | 70 | 75 |
| Appear | Some Devitrification Matte Surface | Matte Surface | Glossy Surface | Glossy Surface |

As can be seen from the above data, under the given melting parameters the relative oxidation state of copper and, hence, the chemical and physical properties of the glass are unaffected by utilizing oxidizing or reducing conditions. Nevertheless, it is also quite apparent that glasses prepared from batches wherein the starting materials contain copper in the cupric state retain copper predominantly in the cupric state, whereas glasses prepared from batches utilizing cuprous copper source materials retain copper predominantly in the cuprous state. The high cupric copper-containing glasses exhibit higher transition temperatures, better durability, and better stability than high cuprous copper-containing glasses.

Example 19 constitutes the most preferred embodiment of the inventive glasses.

I claim:

1. A glass exhibiting a transition temperature below 375° C. and a weight loss of less than 0.1% after immersion in boiling water for six hours, said glass consisting essentially, expressed in terms of mole percent on the oxide basis, of

| $Li_2O$ | 0–15 | BaO | 0–20 |
|---|---|---|---|
| $Na_2O$ | 0–20 | MgO + CaO + SrO + BaO | 0–25 |
| $K_2O$ | 0–10 | $Al_2O_3$ | 0–5 |
| $Tl_2O$ | 0–15 | $B_2O_3$ | 0–5 |
| $Li_2O + Na_2O + K_2O + Tl_2O$ | 12–30 | $Al_2O_3 + B_2O_3$ | 0–5 |
| CuO | 10–50 | ZnO | 0–37 |
| $P_2O_5$ | 28–36 | $Sb_2O_3$ | 0–36 |
| MgO | 0–15 | $CeO_2$ | 0–3 |
| CaO | 0–20 | $MoO_3$ | 0–7 |
| SrO | 0–20 | MnO | 0–20 |
| $WO_3$ | 0–7 | $RE_2O_3$ | 0–2 | wherein at least two alkali metal oxides are present, the predominant proportion of the copper present in the glass will be in the $Cu^{+2}$ oxidation state, and up to 12% by weight of fluoride may optionally be included.

2. A glass according to claim 1 consisting essentially of

| $Li_2O$ | .5–10 | $P_2O_5$ | 30–35 | $Al_2O_3$ | 0–3 |
|---|---|---|---|---|---|
| $Na_2O$ | 5–15 | CaO | 0–15 | $B_2O_3$ | 0–3 |
| $K_2O$ | 0–7 | SrO | 0–15 | $Al_2O_3 + B_2O_3$ | 0–3 |
| $Li_2O + Na_2O + K_2O$ | 13–25 | BaO | 0–15 | ZnO | 0–30 |
| CuO | 15–45 | CaO + SrO + BaO | 0–15 | $Sb_2O_3$ | 0–27 | wherein at least two alkali metal oxides are present and wherein up to 8% by weight fluoride may optionally be present.

* * * * *

UNITED STATES PATENT AND TRADEMARK OFFICE
CERTIFICATE OF CORRECTION

PATENT NO. : 5,286,683
DATED : February 15, 1994
INVENTOR(S) : Bruce G. Aitken It is certified that error appears in the above-identified patent and that said Letters Patent is hereby corrected as shown below:

Column 4, line 39, the footnote for "$RE_2O_3$" is missing. Footnote should read --*$RE_2O_3$ = rare earth metal oxides of the lanthanide series.--

Column 6, line 17, (Table I-continued), "80" should read --8.0--.

Column 7, appx. line 44, "001" should read --0.01--.

Signed and Sealed this

Twenty-first Day of June, 1994

Attest:

BRUCE LEHMAN

*Attesting Officer*  *Commissioner of Patents and Trademarks*